(12) United States Patent
Romagnoli et al.

(10) Patent No.: US 11,922,351 B2
(45) Date of Patent: Mar. 5, 2024

(54) ISSUE TRACKING METHODS FOR QUEUE MANAGEMENT

(71) Applicants: Atlassian Pty Ltd., Sydney (AU); Atlassian Inc., San Francisco, CA (US)

(72) Inventors: Jose Ignacio Romagnoli, Sydney (AU); Mauricio Da Cunha Wolff, Sydney (AU); Abhishek Pradhan, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 32 days.

(21) Appl. No.: 17/489,325

(22) Filed: Sep. 29, 2021

(65) Prior Publication Data

US 2023/0098081 A1   Mar. 30, 2023

(51) Int. Cl.
*G06Q 10/0633* (2023.01)
*G06F 11/34* (2006.01)

(52) U.S. Cl.
CPC ..... *G06Q 10/0633* (2013.01); *G06F 11/3495* (2013.01)

(58) Field of Classification Search
CPC .................................. G06Q 10/0633
See application file for complete search history.

(56) References Cited

U.S. PATENT DOCUMENTS

| | | | |
|---|---|---|---|
| 10,908,950 B1* | 2/2021 | Dennis ................. | G06F 9/4881 |
| 11,379,855 B1* | 7/2022 | Anderson ............. | G06N 20/00 |
| 2007/0013948 A1* | 1/2007 | Bevan ................... | G06F 3/1288 |
| | | | 358/1.15 |
| 2007/0219816 A1* | 9/2007 | Van Luchene ......... | G06Q 10/10 |
| | | | 705/80 |
| 2013/0030826 A1* | 1/2013 | Blom ..................... | G16H 40/20 |
| | | | 705/2 |
| 2013/0103973 A1* | 4/2013 | Werth ................. | H04L 41/0816 |
| | | | 714/2 |
| 2014/0136365 A1* | 5/2014 | Nista ..................... | G06Q 30/06 |
| | | | 705/26.1 |

(Continued)

OTHER PUBLICATIONS

Ngugi et al, Virtual Queue Management System, International Journal of Social Sciences and Information Technology ISSN 2412-0294 vol. IV Issue VIII, Aug. 2018, pp. 8-36 (Year: 2018).*

*Primary Examiner* — Andre D Boyce
(74) *Attorney, Agent, or Firm* — Brownstein Hyatt Farber Schreck, LLP (57) ABSTRACT

Methods and computer readable medium for queue management are disclosed. The method includes displaying a queue panel including two or more queue categories of queues. A queue is configured to include items that have at least one parameter is common. The queue panel is further configured to display activity data corresponding to queues in at least one of the two or more queue categories. The method also includes determining whether the activity data needs to be refreshed, identifying a list of queues belonging to the at least one queue category; generating a refresh request for the identified list of queues; communicating the refresh request to a remote server; receiving updated activity data from the remote server for the identified list of queues; and updating the activity data displayed in the queue panel based on the received updated activity data.

12 Claims, 6 Drawing Sheets

(56) References Cited

U.S. PATENT DOCUMENTS

| | | | |
|---|---|---|---|
| 2015/0106145 A1* | 4/2015 | Hamilton | G06Q 10/063114 705/7.15 |
| 2015/0302334 A1* | 10/2015 | Thomas | G06F 3/0484 705/7.26 |
| 2015/0379456 A1* | 12/2015 | Aynsley-Hartwell | G06Q 10/063114 705/7.15 |
| 2018/0033019 A1* | 2/2018 | Mora | G06Q 50/01 |
| 2018/0097913 A1* | 4/2018 | Smith | G06F 16/252 |
| 2018/0341875 A1* | 11/2018 | Carr | G06F 16/353 |
| 2019/0089713 A1* | 3/2019 | Leftwich | H04L 47/50 |
| 2021/0209679 A1* | 7/2021 | Sanderson | G06F 9/546 |
| 2022/0383236 A1* | 12/2022 | Beede | G16H 40/20 |

\* cited by examiner

ISSUE TRACKING METHODS FOR QUEUE MANAGEMENT

FIELD

Aspects of the present disclosure are directed to issue tracking systems, and in particular to improved queue management.

BACKGROUND

Issue tracking systems are systems that manage the creation and tracking of issues in a variety of contexts. Issue tracking systems are variously referred to as trouble ticket systems, support ticket systems, request management systems, and incident ticket systems.

Some issue tracking systems allow different types of issues to be created and tracked. For example, an issue tracking system may allow users to create their own types of issues and use those issue types for managing a given project (e.g., an IT helpdesk, a software development project, etc.). While allowing users to create and use different issue types provides flexibility, it can also make managing issues, and the relationships between them, difficult. To help with this, some issue tracking systems allow the creation and management of queues. A queue may include a list of issues that have one or more common underlying parameter. By separating incoming issues into different queues, the issues can be better managed. However, existing queues may have a number of problems and it is desirable to have systems with more efficient queue management systems.

SUMMARY

Example embodiments described herein are directed to a computer-implemented method. The method includes displaying a queue panel including two or more queue categories of queues. A queue is configured to include items that have at least one parameter is common. The queue panel is further configured to display activity data corresponding to queues in at least one of the two or more queue categories. The method also includes determining whether the activity data needs to be refreshed, identifying a list of queues belonging to the at least one queue category; generating a refresh request for the identified list of queues; communicating the refresh request to a remote server; receiving updated activity data from the remote server for the identified list of queues; and updating the activity data displayed in the queue panel based on the received updated activity data.

Some example embodiments are directed to a non-transitory computer readable medium comprising instructions, which when executed by a processor of a computer device cause the computing device to perform steps. The steps include displaying, on a display of the computer device, a queue panel, the queue panel displaying two or more queue categories of queues. A queue is configured to include items that have at least one parameter is common. The queue panel is further configured to display activity data corresponding to queues in at least one of the two or more queue categories. The steps further include determining whether the activity data needs to be refreshed, and identifying a list of queues belonging to the at least one queue category in response to determining that the activity data needs to be refreshed. The steps also include generating a refresh request for the identified list of queues, communicating the refresh request to a remote server, receiving updated activity data from the remote server for the identified list of queues, and updating the activity data displayed in the queue panel based on the received updated activity data.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Overview

An issue tracking system (ITS) provides users with the ability to create and track issues—or, more generally, work items. A work item is an item with associated information and an associated lifecycle—i.e. a series of states through which the work item transitions over its lifecycle. The lifecycle for a given work item may be simple (e.g. an open state and a closed state) or more complex (e.g. open, closed, resolved, in progress, and reopened).

The particular information and lifecycle associated with a work item may vary greatly depending on the scenario in which the ITS is implemented. By way of example, an ITS may be implemented in a helpdesk scenario, in which case the work items may be issues or tickets logged with the helpdesk. An ITS may be implemented in a project management scenario, in which case the work items may be project tasks. An ITS may be implemented in a software development scenario, in which case work items may be bugs, current features under development, and/or features intended for further development. An ITS may be implemented in an organizational administration scenario, in which case work items may be administrative forms (e.g. leave request forms or the like). An ITS may be used in an organization's customer support center to create, update, and resolve reported issues by customers and/or employees. Many other ITS implementations in which different work items are tracked through different lifecycles are possible.

For ease of reference, the following disclosure will refer to issues, however the features and operations described could apply to any other type of work item maintained by an ITS.

One example of an ITS with which the present disclosure may be implemented is Jira Service Management (JSM), which is commercially available from Atlassian. For the purposes of explanation the present disclosure will predominantly refer to JSM, however the features described herein could be applied to alternative issue tracking systems.

When an ITS is used to handle a small number of issues or work items at any given time, it is relatively easy to assign these work items to agents and easy for the agents to manage the issues assigned to them. However, when an ITS is used by a large organization to handles thousands if not hundreds of thousands of issues—management of issues becomes difficult. To help with this, some ITSs allow the creation and management of queues. As described previously, a queue includes a list of issues that have one or more common underlying parameters. For example, a helpdesk ITS for a multi-national company with offices in New York, London, and Dubai, may setup three different queues—New York issues, London issues, and Dubai issues. New issues received or created by the ITS are then assigned to one of these queues depending on which office the issues related to. Similarly, organizations can create queues based on any other parameters such as issue types, issue priority, workflow status (e.g. open, unassigned, assigned, closed, resolved, in progress, reopened, etc.). An example queue panel 100 showing issue queues is shown in FIG. 1.

Figure 1:
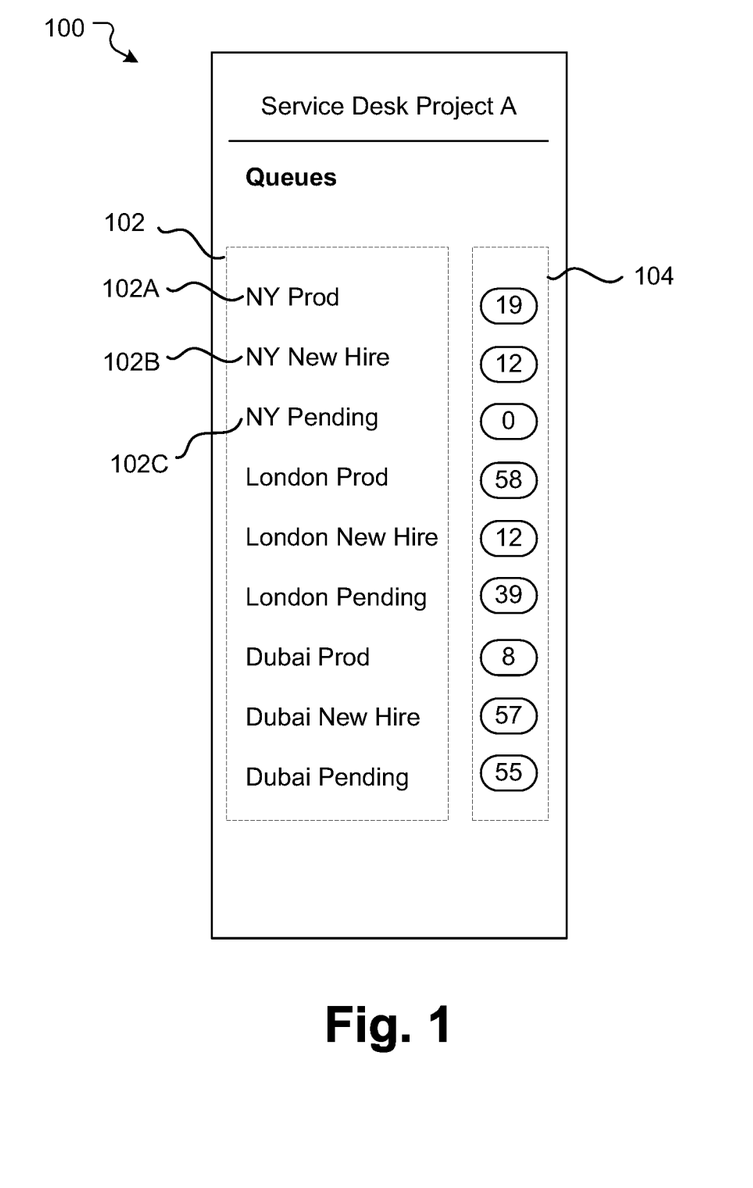
FIG. 1 illustrates a conventional queue panel.

In particular, FIG. 1 shows a conventional queue panel 100. This queue panel 100 may be seen by an agent when the agent logs into the ITS and views for example a dashboard or homepage of the ITS. In some examples, the queue panel 100 may be displayed as a side panel on a user interface—such that it is visible to agents even when they switch from issue to issue in a main user interface panel (not shown).

As seen in FIG. 1, the queue panel 100 includes multiple queues 102 including the queues, "NY Prod" 102A, "NY new hire" 102B, and "NY pending" 102C. The panel 100 includes similar queues for London and Dubai. For each queue, the panel 100 also displays the number of issues in the corresponding queue (or issue count) 104 as a number beside the queue name. For example, the queue "NY Prod" has an issue count of 19 and the queue "NY New Hire" has an issue count of 12.

Typically, the queue panel 100 displays all the queues setup by an organization to all agents. Agents typically do not have any control over the queues that are visible to them. Instead, administrators control adding/modifying/deleting queues to/from the queue panel 100.

Further, although agents can see all the queues associated with an organization, they are typically only responsible for issues in a handful of these queues. In the example shown in FIG. 1, an agent may only be responsible for issues out of the NY office. In this case, the agent may mostly work on issues in the "NY Prod," "NY pending," and "NY New Hire" queues and may rarely need to consider the issues in the London or Dubai queues. In such cases, on most days, a given agent may only need to have the queues the agent typically works with visible to them. The remaining queues and their multiple issues clutter the queue panel 100, increasing the cognitive burden on the agent, and providing an unsatisfactory UI experience. For example, the agent that works on issues in the Dubai queues (which are located at the bottom of the queue panel 100 has to navigate the list of queues every time the agent wishes to select a queue. This can be tedious, time consuming and burdensome on the agent (especially if the queue panel includes many queues and the agent has to scroll through the list to select a queue).

Additionally, ITSs conventionally refresh the issue count 104 at predetermined intervals to show the information for the displayed queues. Accordingly, if an organization has over 50 queues, each active agent's client device may generate and communicate refresh requests to the ITS server to provide the latest issue count of each of the 50 queues at the predetermined interval (e.g., every 60 seconds). As can be appreciated, these requests can be computationally expensive for any server and can significantly affect the server and database load. Further, if the server is already busy responding to other requests, responding to queue refresh requests from the client devices may slow down the server such that there are delays not only in responding to the queue refresh requests but also potentially to other higher priority and more important requests. If the server is based on a scalable architecture, additional server nodes may be commissioned to handle the high level of client requests. However, adding additional server nodes may be expensive.

To overcome one or more of these issues, aspects of the present disclosure provide more efficient queue management systems and methods. In some embodiments, the present disclosure provides mechanisms to declutter the queue panel displayed on an agent's user interface such that it only displays queues that are important to the agent. Queues that the agent is not interested is or doesn't work with may be removed from the queue panel. In some other embodiments, the present disclosure provides mechanisms to declutter the queue panel by displaying queues that are important to an agent in a highly visible part of the queue panel (e.g., at the top of the queue panel) and displaying other queues in less visible parts of the queue panel (e.g., towards the bottom of the queue panel) or hidden (temporarily or permanently).

Further still, in some examples, the queues can be organized into groups or categories. Queues added to a given group or category can then have the same rules as other queues in that category. Agents can control which queues are added to which category, thereby providing an agent-driven system.

By distinguishing between queues that are relevant to an agent from other queues, aspects of the present disclosure reduce the cognitive burden on agents and improves their time to action. In addition, the customizable views minimize distractions for the agents and allows more efficient workflow.

Further still, in some embodiments, in addition to or instead of the issue count, the queues of the present disclosure may display other activity data about the queue. As used in this disclosure, activity data refers to any data that may indicate information about a queue. Activity data may include, e.g., number of issues in a queue (issue count), number of new issues in a queue (delta count), number of unassigned issues in a queue, number of new comments in a queue, etc. In addition to counts, activity data can indicate other information about the queues such as status changes of issues in a queue, creation or closure of issues, mentions or comments in a queue.

Although issue counts may be useful in some cases, e.g., to quickly inform an agent of the number of issues that may require the agent's attention, count or delta of issues may not always be useful. For example, in some cases, an agent may have actioned all the items in a given queue, but may be waiting on comments from other users or customers. In such cases, the count of issues in a given queue may not provide additional information to the agent. Instead, the agent may be interested in being informed when a customer/user posts a new comment in an issue in the agent's queue. In such cases, aspects of the present disclosure may include new comment activity data for the queues.

Different indicia or markers may be used to indicate different types of activity data. For example, if a queue includes issues that have been resolved, the color of the queue name can be changed to green. Similarly, if new unassigned issues exist in a queue, the queue name can be updated to bold and/or red. If a queue includes unseen comments, a chat icon or emoji may be displayed next to the queue name, and so on. Further, the queue panel may be configured to show multiple types of activity data (such as issue count and new messages). The configuration may be performed by the agent or an administrator. Further, it may be possible to show different types of activity data for different queues. For instance, an agent may be able to select the activity data the agent wishes to view per queue or per queue category.

In some embodiments, the present disclosure provides mechanisms to reduce network traffic and server loads. In particular, in some embodiments, the systems and methods may refresh activity data associated with a queue (e.g., issue count) at different rates. For example, the issue count of queues in a group relevant to the agent may be refreshed at a higher rate than the issue count of queues in other queue groups. Further, the systems and methods may not request activity data refresh for hidden queues. This way, by requesting refresh for a subset of the queues, aspects of the present disclosure reduce network traffic and server load.

The activity data may be updated based either on a polling method—where the client requests refreshes at fixed intervals or based on a publish-subscribe model—where the server sends updates to the client at fixed intervals or whenever there is a change. In either case, if a fixed interval is used, the refresh rates may be predetermined, set by an agent, or dynamically changed based on server loads—if the server load is below a threshold, refresh rates for different groups may be increased and if server loads are above a threshold, the refresh rates may be decreased.

Figure 2:
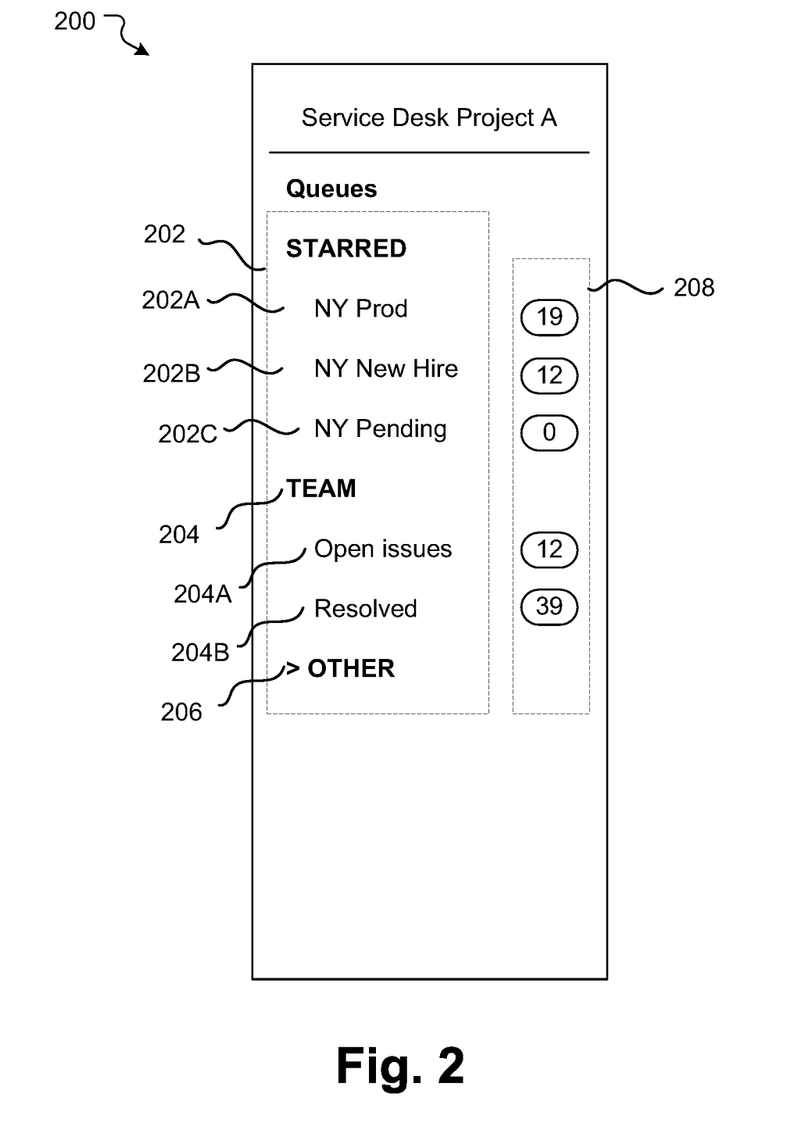
FIG. 2 illustrates an example queue panel according to aspects of the present disclosure.

FIG. 2 shows an example queue panel 200 of a user interface according to aspects of the present disclosure. As seen in this example, queues are divided into three distinct categories or groups—a first category 202 (STARRED), a second category 204 (TEAM), and a third category 206 (OTHER). All queues available in the first and second categories 202, 204 are visible to the agent whereas the queues in the third category 206 may be collapsed or hidden in the default view.

In this example, the first category is a user-define category—i.e., an agent can select which queues are part of the first category. For example, an agent can add queues that the agent regularly works on and want to see to the first category 202. In this example, the agent has added the queues, "NY prod", "NY New Hire" and "NY pending" to the STARRED category 202. The queues 202A, 202B and 202C are then displayed first in the queue panel 200 under the STARRED category 202. Activity data 208 (which in this example is issue count) is also shown for each of the queues in the first category 202.

The second category 204 may include queues that are visible in the queue panel but not necessarily considered relevant by the agent or user-defined. In some cases, these queues may be considered relevant by administrators. These queues may be related to critical issues or issues that affect the entire team/organization. The activity data 208 for queues in this category may also be displayed.

The third category 206 may include queues that are not added by the agent to the first category 202 or added to the second category 204 by the admin. Although the queues present in the OTHER category 206 are hidden in default view, this category can be expanded to display all the queues in this category. Agents can then review the queues and select one or more queues to add to the first category 202. In some examples, activity data 208 may not be displayed for queues in the OTHER category 202.

Although this example shows three categories 202-206, it will be appreciated that in other examples the number and types of categories may vary. For example, in some cases, there may only be two groups—MY QUEUES and OTHERS or TEAM QUEUES and OTHERS. In other cases, there may be other or additional groups/categories.

Further still, in some examples, rules may be configured to automatically update the category of queues when certain conditions are met. For example, queues may be removed from one of the collapsed categories to one of the visible categories (such as STARRED, MY QUEUES, or TEAM) if it is determined that an incident has occurred in one of the queues. Similarly, a queue may automatically be added to one of the visible categories if it is determined that the queue includes one or more priority issues. This way, urgent tasks can be brought to the agent's notice even if the tasks are not present in the agent's usual queues.

The groups shown in the queue panel 200 may have different activity data 208 refresh rates. For example, the queues in the first category 202 may have one refresh rate (e.g., every 60 seconds), the queues in the second category 204 may have a different refresh rate (e.g., every 5 minutes), and the queues in the third category 206 may have yet another refresh rate (e.g., infinity). This way, activity data associated with queues that the agent usually works with are constantly refreshed to provide the agent the most current information about those queues whereas the activity data of other queues is refreshed at a lower rate to reduce network traffic and server load.

Environment Overview

Figure 3:
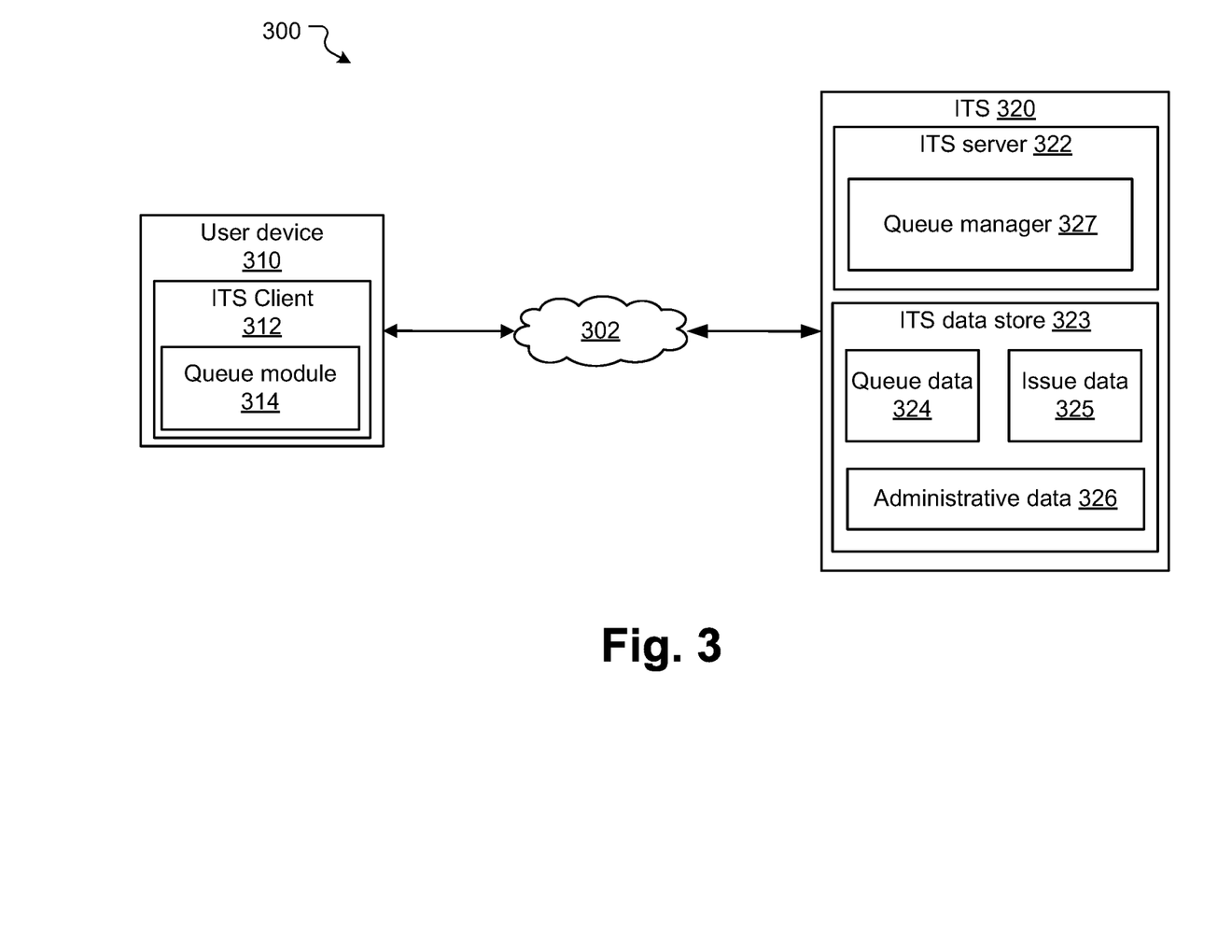
FIG. 3 is a block diagram depicting a networked environment in which various features of the present disclosure may be implemented.

FIG. 3 depicts an example networked environment 300 in which various operations and techniques described herein can be performed. Example environment 300 includes a communications network 302, which interconnects user device 310 and an issue tracking system (ITS) 320.

The client device 310 may be any devices suitable for performing client-side operations described herein, for example a mobile device (e.g. a tablet or mobile phone), a portable device (such as laptop computer), or any other computing device (e.g. a desktop computer). While only one user device 310 have been illustrated, an environment would typically include multiple user devices 310 interacting with the ITS 320.

Users of the client device 310 are associated with one or more user accounts and generate and/or communicate electronic content to the ITS 320. This includes any type of user account interaction with the ITS 320, including, for example, accessing/viewing and/or contributing to one or more issues hosted by the ITS 320, and viewing or modifying queue panels (such as queue panel 200) displayed on a user interface on a display of the client device 310.

In order to allow users to perform these functions, as illustrated in FIG. 3, the client device 310 includes one or more client (software) applications (e.g., ITS client 312) that is configured to access applications made available by the ITS 320. The ITS client 312 may communicate with the application hosted by the ITS 320, render user interfaces based on instructions received from the ITS server 322, and receive inputs from user accounts allowing them to interact with the applications hosted by the ITS 320.

The ITS client 312 includes instructions and data stored in the memory (e.g. non-transient compute readable media) of the client device 310 on which the application is installed/run. These instructions are executed by a processor of the client device 310 to perform various functions as described herein. By way of example, some functions performed by the integration client 312 include communicating with the ITS application hosted by the ITS 320, rendering user interfaces (showing issue data) based on instructions received from the ITS 320, receiving inputs from users to interact with user interfaces made available by the primary product platform 320, and communicating user inputs to the ITS 320 to update issue data managed by the ITS 320.

The ITS client 312 further includes a queue module 314 configured to allow users to manage issue queues. In particular, the queue module 314 may be configured to generate and render a user interface showing a queue panel (such as queue panel 200) that is powered by the ITS 320, communicate with the ITS 320 to refresh activity data 208 and allow agents/administrators to modify the queue panel 200, update queue categories, add or delete queues or queue categories, etc.

The ITS client 312 may be implemented in various ways. For example, the ITS client 312 may be a web browser application, which accesses the applications hosted by the ITS 320 via appropriate uniform resource locators (URL) and communicates (using a communication interface such as 418 described below) with the ITS 320 (and, in particular, the ITS server application 322) via general world-wide-web protocols. In this case, the web browser application is configured to request, render and display user interfaces that conform to a mark-up language, and may be capable of internally executing browser-executable code, or other forms of code. Alternatively, the ITS client 312 may be a specific application programmed to communicate with the ITS 320 using defined application programming interface (API) calls.

ITS 320 in this example includes an ITS server application 322 for hosting an ITS software application, and an ITS data store 323 for storing application specific data.

In order to run an ITS, the ITS server application 322 comprises one or more application programs, libraries, APIs or other software elements which, when executed, configure the ITS 320 to provide server side ITS functionality—e.g. by receiving and responding to requests from ITS client applications (e.g. client application 312), storing/retrieving data from the ITS and data store 323, and performing other operations as described herein. In one example, the ITS server application 322 includes a queue manager 327 configured to manage issue queues. In particular, the issue queue manager 327 may be configured to communicate with queue modules 314 of user devices 310, communicate queue data to the queue modules 314, receive and respond to activity data refresh requests, etc.

ITS server application 322 may be a web server (such as Apache, IIS, nginx, GWS, or an alternative web server for interacting with web browser clients) or an application server (i.e. specifically programmed to interact with dedicated application clients using a defined set of application programming interface (API) calls).

ITS data store 323 is used to store data related to the ITS application including e.g., data defining the operation of the ITS application (for example, user accounts, user permissions, and the like) as administrative data 326; and issue data 325 (e.g., issue name, issue ID, issue status, issue workflows, etc). In addition, the ITS data store 323 stores queue data 324.

The queue data 324 may include one or more data structures, for example, including queue data (e.g., queue identifier, queue name, date created, etc.). These data structures will be described in more detail below.

ITS data store 323 may be provided by a database server (not shown) which may be hosted by server 322, but is more typically hosted on a separate physical computer in communication (directly or indirectly via one or more networks 302) with the server 322. While a single ITS data store 323 is described, multiple separate data stores could be provided.

While single server architecture has been described herein, it will be appreciated that the ITS server 322 and data store 323 can be implemented using alternative architectures. For example, in certain embodiments, the ITS 320 is a scalable system including multiple distributed server nodes connected to one or more shared data stores (e.g. shared file servers). Depending on demand from clients (and/or other performance requirements), ITS 320 server nodes can be provisioned/de-provisioned on demand to increase/decrease the number of servers offered by the ITS 320. Each ITS server 322 may run on a separate computer system and include one or more application programs, libraries, APIs or other software that implement server-side functionality. Similarly, the data store 323 may run on the same computer system as an ITS server application 322, or may run on their own dedicated system(s) (accessible to ITS server application(s) 322 either directly or via a communications network).

Communications between the various systems in environment 300 are via the communications network 302. Communications network may be a local area network, public network (e.g. the Internet), or a combination of both.

While environment 300 has been provided as an example, alternative system environments/architectures are possible.

Hardware System

The embodiments and features described herein are implemented by one or more special-purpose computing systems or devices. For example, in environment 300 each of the user devices 310 and ITS 320 is or includes a type of computing system.

A special-purpose computing system may be hard-wired to perform the relevant operations described herein. Alternatively, a special-purpose computing system may include digital electronic devices such as one or more application-specific integrated circuits (ASICs) or field programmable gate arrays (FPGAs) that are persistently programmed to perform the relevant operations. Alternatively, a special-purpose computing system may include one or more general-purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 4:
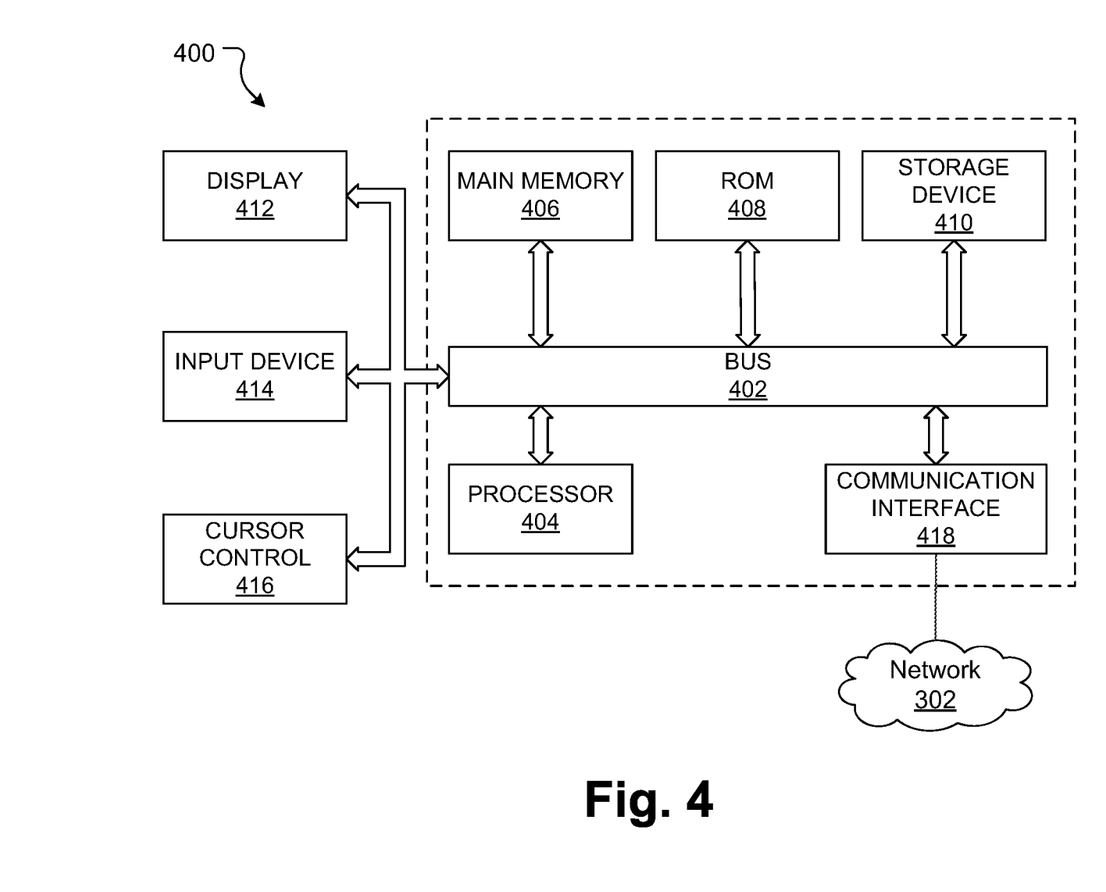
FIG. 4 is a block diagram of a computer processing system configurable to perform various features of the present disclosure.

By way of example, FIG. 4 provides a block diagram that illustrates one example of a computer system 400, which may be configured to implement the embodiments and features described herein. Computer system 400 includes a bus 402 or other communication mechanism for communicating information, and a hardware processor 404 coupled with bus 402 for processing information. Hardware processor 404 may be, for example, a general-purpose microprocessor, a graphical processing unit, or other processing unit.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

In case the computer system 400 is the client device 310, the computer system 400 may be coupled via bus 402 to a display 412 (such as an LCD, LED, touch screen display or other display), for displaying information to a computer user. An input device 414, including alphanumeric and other keys, may be coupled to the bus 402 for communicating information and command selections to processor 404. Another type of user input device is cursor control 416, such as a mouse, a trackball, or cursor direction keys for communicating direction information and command selections to processor 404 and for controlling cursor movement on display 412.

According to one embodiment, the operations described herein are performed by computer system 400 in response to processor 404 executing one or more sequences of one or more instructions contained in main memory 406. Such instructions may be read into main memory 406 from another storage medium, such as a remote database. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but may be used in conjunction with, transmission media. Transmission media participates in transferring information between storage media. For example, transmission media includes coaxial cables, copper wire, and fiber optics, including the wires that comprise bus 402. Transmission media can also take the form of acoustic or light waves, such as those generated during radio wave and infrared data communications.

Computer system 400 also includes a communication interface 418 coupled to bus 402. Communication interface 418 provides a two-way data communication coupling to a communication network, for example communication network 302 of environment 300. For example, communication interface 418 may be an integrated services digital network (ISDN) card, cable modem, satellite modem, etc. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Computer system 400 can send messages and receive data, including program code, through the network(s) 302 and communication interface 418.

As noted, computer system 400 may be configured in a plurality of useful arrangements, and while the general architecture of system 400 may be the same, regardless of arrangements there will be differences. For example, where computer system 400 is configured as a server computer (e.g. such as ITS 320), it will typically be provided with higher end hardware allowing it to process data, access memory, and perform network communications more rapidly than, for example, a user device (such as user device 310).

Example Data Structures

This section describes some of the data structures maintained in the ITS data store 323. In particular, it describes queue-related data structures maintained by the ITS data store 323. The data structures and fields described below are provided by way of example. Depending on the implementation, additional, fewer, or alternative fields may be used. Further, the fields described in respect of a given data structure may be stored in one or more alternative data structures (e.g. across multiple linked data structures). Although tables are used to illustrate the data structures, the relevant fields/information may be stored in any appropriate format/structure.

Table A illustrates an example data structure for queue data 324. In particular, this data structure stores a list of active queues associated with a given organization or ITS project. In particular, this data structure stores the names and unique identifiers of the active queues. Whenever a new queue is created, a unique identifier is generated for the queue and a new entry is created for the queue in table A. When a queue is deleted, the corresponding entry from the table below is also deleted. Although the table below is shown with just the queue identifier and queue name, the data structure may not be limited to just these fields. Instead, it may include further information such as queue creation date, rules or parameters utilized to create the queue, etc.

TABLE A

| queue data | |
|---|---|
| Queue ID | Queue name |
| 1 | Australian Support |
| 2 | US Support |
| 3 | NY Prod |
| 4 | NY New Hire |
| 5 | NY Pending |
| . . . | . . . |

Typically, in an ITS, an organization may create a single project or multiple projects. Each project can be associated with one or more queues. Agents that are part of a given project typically have access to and can view all the queues associated with the given project. Further, in some cases where an organization has a single agent team or just a couple of agent teams, each team may be associated with all the projects associated with the organization. In such cases, all agents may be able to view queues associated with all the projects in the organization. In other cases, where an organization has a large number of projects and/or a large number of agent teams, the organization may consider assigning different agent teams to different projects and sometimes it may consider assigning different queues within a given project to different agent teams. For instance, if an organization had one project including 20 queues and 4 agent teams, each agent team may be roughly assigned five queues to handle. In such cases, the data store may also store a data structure storing information related to queue assignments.

Table B illustrates such an example data structure. In particular, this table stores a list of teams along with identifiers of the queues assigned to each team. In some cases, a single team may be assigned to a given queue. In other cases, multiple teams may be assigned to multiple overlapping queues. For example, an Australian agent team may be assigned to the 'AUSTRALIA SUPPORT' queue, whereas all the teams may be assigned to the 'URGENT INCIDENT' queue. Like table A, this table is also active and can be modified in real time, for example, if an administrator assigns a queue to a new team or removes assignments, the table is updated.

Further, it will be appreciated that this table corresponds to a given project. In other examples, the ITS may maintain a single data structure to store queue data for all projects associated with the organization. In this case, the table may further include a project identifier field to help distinguish between queues associated with different projects.

TABLE B team related queue data

| Queue ID | Queue name | Associated team ID | Associated team name |
|---|---|---|---|
| 1 | Australia Support | 21 | Australia |
| 2 | US Support | 22 | Dallas |
| 2 | US Support | 23 | New York |
| 3 | NY Prod | 23 | New York |
| 4 | NY New Hire | 23 | New York |
| 5 | NY Pending | 23 | New York |
| 6 | Urgent incident | 21 | Australia |
| 6 | Urgent incident | 22 | Dallas |
| 6 | Urgent incident | 23 | New York |
| ... | ... | ... | ... |

In Table B, for each record, there is stored: a unique identifier for the queue; the name of the queue; a unique identifier for the associated team; and the name of the associated team;

In addition to the queue/team data structure, the data store 323 may also maintain a data structure for recording data about agent-selected queues (e.g., queues that are part of the STARRED categories). In particular, if agents are allowed to prioritize or otherwise indicate queues they are interested in or wish to see in their queue panels, this information is stored in a data structure. Table C includes this information.

TABLE C user related queue data

| Unique user ID | Queue ID | Queue name | Order |
|---|---|---|---|
| 1234 | 3 | NY Prod | 1 |
| 1234 | 4 | NY New Hire | 2 |
| 1234 | 5 | NY Pending | 3 |
| 1235 | 1 | Australian Support | 1 |
| 1237 | 3 | NY Prod | 3 |
| 1237 | 4 | NY New Hire | 1 |
| 1237 | 5 | NY Pending | 2 |
| 1238 | 2 | US Support | 1 |
| ... | ... | ... | ... |

As seen in the table above, for each unique user ID, the table stores the queue identifiers of the queues that have been starred/pinned/prioritized or otherwise identified as important for the user. The table may also optionally store the queue name and the order in which the queue items are to appear on the user's queue panel 200. It will be appreciated that this ordering may be optional and in some cases, the starred queues may be displayed in an alphabetical order. In such cases, the order column may not be required.

Finally, the ITS data store 323 may store data structures that indicate relationship between agents and teams. Table D shows this information.

TABLE D user-team related data

| Unique user ID | User name | Team ID | Team name |
|---|---|---|---|
| 1234 | John Doe | 21 | Australia IT |
| 1235 | Jane Deer | 24 | New York HR |
| 1236 | Sam Smith | 28 | Dallas IT |
| 1237 | Tom Jones | 24 | New York HR |
| 1238 | Janice Jane | 24 | New York HR |
| 1239 | Rachael Adams | 21 | Australia IT |
| 1240 | Pierce B | 23 | Australia HR |
| 1241 | Andy Dufresne | 25 | Dallas HR |
| ... | ... | ... | ... |

As seen in the table above, for each unique user ID, the table stores the user name, team identifier of the team the user is associated with and the name of the team. Although a user is shown as belonging to a single team in this table, users may be associated with multiple teams. In such cases, the table may include multiple rows of records for a given user where each of the multiple rows includes data about one team the given user is a part of.

Further, in some embodiments, although the server may determine activity data on the fly (e.g., in response to requests from user devices), it may cache some activity data (e.g., absolute counts of issues, comments, etc.) for predetermined periods of time (e.g., 30 seconds, 10 minutes, etc.) to improve performance.

As noted, additional data structures to those shown above may be used in implementing the embodiments described herein. For example, while no user account data structure has been shown, such a structure would typically be used in order to associate unique user account identifiers with their relevant details such as name, title, teams the user is assigned to, permissions, etc.—such a data structure would form part of ITS administration data 326.

Example Methods

Various methods for creating and managing queues will now be described. The methods shown in FIGS. 5-6 will be described as being performed by the systems (e.g., client device 310 and ITS platform 320) described in FIG. 3. In alternative embodiments, the processing described may be performed by one or more alternative systems (operating in conjunction with systems 310-320 or independently) and/or alternative applications running on those systems.

Further, the methods disclosed herein will be described with reference to an example ITS. In particular, the ITS may be installed and executed for organization ABC that has a single project associated with multiple teams, each team including multiple agents. Further, the project has been organized such that it includes multiple queues. Each queue is assigned to at least one team of the organization. It will be appreciated that this is merely an example and that in actual implementation organizations may have any number of projects, teams, and queues and can implement the methods disclosed herein. For example, in some cases although organizations may divide issues and queues into different projects, an agent may have access to queues associated with different projects.

In one example, queues may be created or deleted by administrators or users with queue edit permissions. An administrator operating on user device 310 may create a queue using a user interface (not shown) that allows the administrator to add queue data such as a queue name and one or more rules for adding issues to the queue. For example, if an organization launches a new product, the administrator may create a new queue to receive any issues related to that new product. In this case, the administrator may set a rule to parse certain fields of issues to identify the name of the newly launched product. If the name of the newly launched product is identified, the corresponding issues are associated with the newly created queue.

In addition to the queue name and queue rules, the administrator may further assign one or more agent teams to the queue or indicate that the queue should be visible to all agents within the organization. If agent teams are assigned or the administrator marks the queue as being visible to all agents, the corresponding queue may show up in the TEAM category 204 of the queue panel 200. Alternatively, if no team is assigned or the administrator does not indicate that the queue needs to be visible to all agents, the corresponding queue may show up in the OTHER category 206 of the queue panel 200.

Once the administrator provides this queue information via the user interface, the administrator may submit the information. This causes the queue module 314 on the user device 310 to communicate the entered information along with the administrator's details to the server 322. The server 322 determines whether the administrator has permission to edit queue data and upon determining that the user has permission to edit queue data, the server 322 communicates the data to the queue manager 327. The queue manager 327 in turn creates the corresponding queue and updates data structures in the data store. For example, it may update tables A and B to add the new queue record and corresponding assigned teams (if provided).

Administrators may be able to update queues at any time. For instance, an administrator may be able to update team assignments, change queue names, update queue rules, or even delete one or more queues entirely. Each time this happens, the queue manager 327 updates the underlying queue data (e.g., in tables A, B and/or C).

Agents on the other hand, may not have permissions to create/modify/delete queues. Instead, they may have permissions to modify the display of queues in their own queue panels 200. In particular, agents may be allowed to move queues between various queue categories, select the activity data 208 displayed in the panel 200, and in some cases even modify the refresh rates of the displayed activity data 208.

Figure 5:
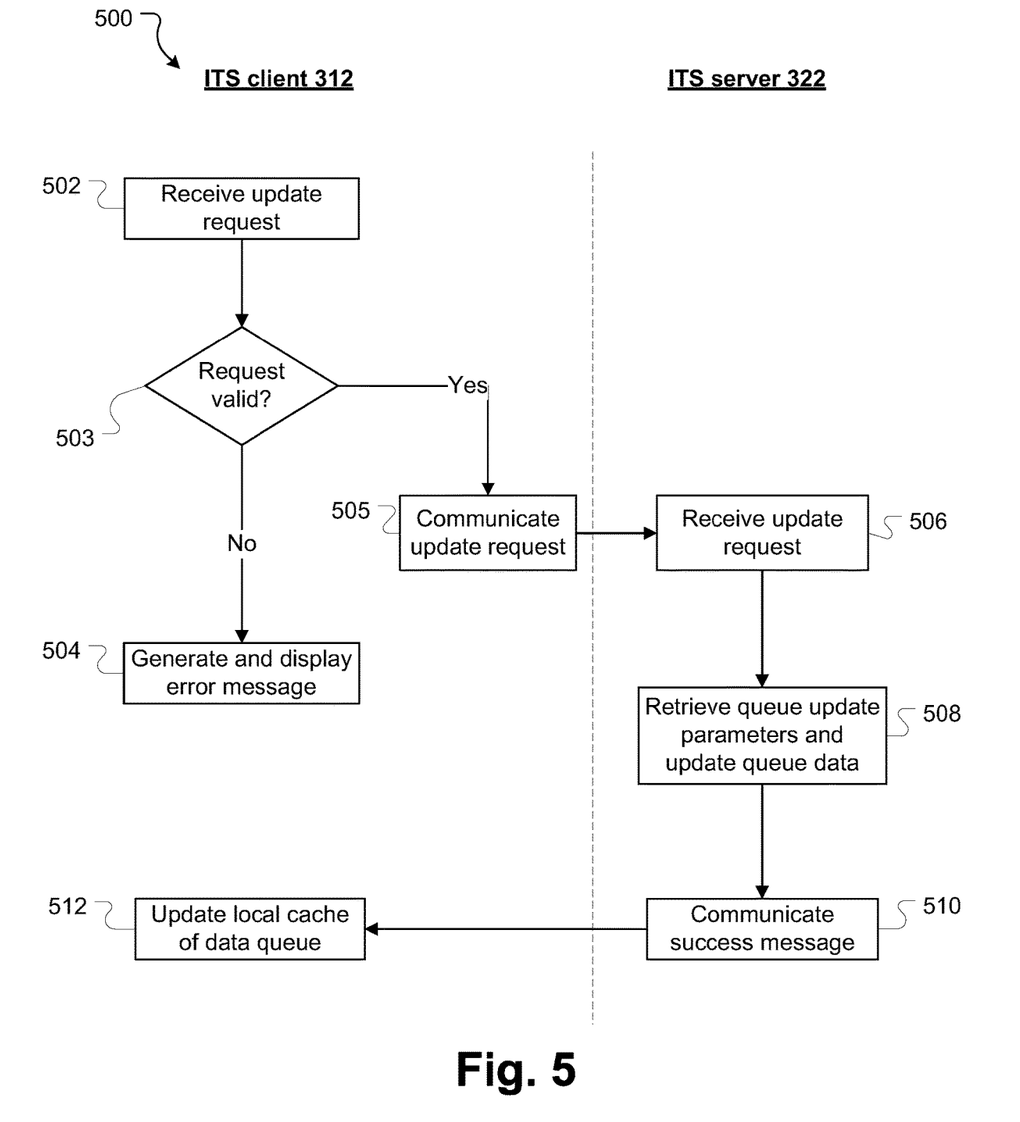
FIG. 5 is an example flowchart illustrating operations performed to update a queue category.

FIG. 5 illustrates an example method 500 for performing such operations and in particular for updating the category of a queue according to some aspects of the present disclosure.

The method 500 commences at step 502, where a request to update queue category for a selected queue is received by the ITS client 312.

In one example, the request may be initiated by an agent, using user device 310. For instance, if the queue panel is one such as queue panel 200 shown in FIG. 2, which has three queue categories—STARRED, TEAM and OTHER, the agent may select a queue shown in any one of these categories and attempt to add the selected queue to a different category. For instance, the agent may select the queue 'OPEN ISSUES' 204A from the TEAM category 204 and attempt to add this queue to the STARRED category 202. This may be done, e.g., by clicking on the queue 204A, and selecting a different queue category from a pop-up menu or by selecting the queue name 204A, dragging it to the starred category 202, and dropping it.

When the agent performs such an action, the client device 310 and in particular, the queue module 314 generates a queue update request at step 502. The queue update request may include, e.g., a unique identifier of the selected queue and an identifier of the update category. The request may further include a unique user ID of the agent making the update request.

At step 503, the queue module 314 determines whether the queue update request is valid. To this end, the queue module 314 may maintain one or more rules that should be met to validate queue update requests. For example, in some cases, agents are not allowed to move queues associated with the TEAM category 204 to the OTHER category 206 or move queues into the TEAM category 204 that aren't assigned as team queues by administrators. That is, agents may be allowed to move queues from the TEAM category 204 to the STARRED category 202 but not to the OTHER category 206. Similarly, STARRED queues that were originally part of the OTHER category 206 can be moved back to the OTHER category 206, while STARRED queues that are also associated with the TEAM category 204 cannot be moved to the OTHER category 206. Instead, when these queues are removed from the STARRED category 202 they automatically return to the TEAM category 204.

Accordingly, at step 503, if the queue module 314 compares the queue update request with the predefined rules and determines that the request is invalid, the method proceeds to step 504 where the queue module 314 generates an error message for display on the user device 310. The error message may indicate that the operation cannot be performed. Consequently, the queue category is not updated and the method 500 ends.

Alternatively, if at step 503, the queue module 314 compares the queue update request with the predefined rules and determines that the request is valid, the method proceeds to step 505, where the queue manager 314 communicates the update request to the ITS server 322. At step, 506, the ITS server 322 receives the queue update request and communicates it to the queue manager 327.

At 508, the queue manager 327 parses the request to retrieve the queue identifier and the user identifier from the request. The queue manager 327 utilizes this information to update queue data stored in the data store 324. For instance, if the update request is to add a queue to the STARRED category 202 or remove a queue from the STARRED category 202, the queue manager 327 updates table C to reflect this change. For instance, it adds a new record for the given user identifier that includes the queue identifier received in the update request (e.g., if the agent attempted to add a queue to the STARRED category). Alternatively, it deletes an existing record for the given user identifier that includes the queue identifier received in the update request (e.g., if the agent attempt to remove a queue from the STARRED category).

At 510, the queue manager 327 communicates a success message to the ITS client 312—informing the client that the data store 324 has been successfully updated. In one example, this may be a simple binary TRUE/FALSE response.

At 512, once the ITS client 312 and in particular the queue module 314 receives the communication from the ITS server 322 it updates a local queue data cache (described later) upon receiving the update queue category communication from the ITS server 322.

In method 500, the queue manager performs the validation check at step 503 (after the agent has already attempted to update the category of a queue). In some examples, this step can be skipped—e.g., if all types of queue category modifications are allowed. Further, in some other examples, options for performing disallowed actions may be disabled on the user interface—preventing the user from even trying such actions. For example, continuing with the above example where queues from the TEAM category cannot be moved to the OTHER category or otherwise hidden, in this case, when the agent attempts to update the category of such queues the agent may only be shown allowable options, such as changing category to STARRED.

Although the example method 500 is described with reference to systems that include three categories including an admin-controlled category, it will be appreciated that this is merely an example. In implementation, method 500 can be used to update a queue's category in systems that include any other number of types of categories without departing from the scope of the present disclosure.

When a user first opens the ITS client 312 on their user device 310, a homepage (i.e. a primary or default page) may be displayed on the user device 310. The homepage may include a queue panel 200 according to aspects of the present disclosure. The information displayed in the queue panel 200 is generated based on the agent's previously saved preferences. The preferences may include, e.g., which queues are displayed in a given category and what activity data is displayed.

In one example, user preferences may be stored in the data store 324 (e.g., as part of the administrative data 326). When the user first logs in, this user preference data is communicated to the client 312 along with queue data so that the client 312 can render and display the queue data based on the stored user preferences. In one example, the queue data includes, e.g., list of queue categories and queue category information, such as isStarred, isVisible, isTeam; list of all active queue names associated with the project the user has access to (retrieved from Table A); list of queues that are relevant to the user (retrieved from Table C); optionally, if the system uses TEAM categories, a list of team queues (retrieved by looking up in table D to determine the user's team(s) and table B to determine the queues assigned to the user's team(s)); current activity data for queues that are relevant to the user and optionally current activity data for TEAM queues; and refresh rates for the different queue categories.

This queue data is communicated to the client 312 and in particular to the queue module 314. The queue module 314 stores this data in a local cache and renders a queue panel 200 based on the received queue data and user preferences. For example, it renders and displays the different queue categories, adds queue names under the first category 202 (i.e., queues relevant to the user) and optionally adds queue names under the second category 204 (i.e., queues controlled by admin). No queue data may be rendered for the third category 206 (i.e., active queues that are not relevant to the user).

Further, the queue module 314 selects activity data associated with the queues based on user preferences and adds the current activity data 208 to the displayed queue panel for one or more categories of queues. For example, a user preference may be to display an issue count of the number of issues in a queue. In another example, a user may configure their preferences such that a change in the count (delta) is displayed instead of the issue count. In other examples, a user may configure their preferences such that queues that have unseen comments are highlighted; or a count of unseen comments is displayed; or queues that have any new activity (e.g., change in workflow status) are highlighted. In other examples, the user can configure their preferences such that two or more types of activity data is displayed or indicated in the queue panel.

Once the queue panel 200 is rendered, the activity data is periodically updated. To do this, the queue module 314 maintains one or more time counters in the local cache. A time counter is a periodic internal clock that may be set to a predetermined value. For example, a time counter may be set to 60 seconds. The time counter counts to 60 seconds, then resets and repeats to count to 60 seconds. The time counter(s) maintained by the queue manager 314 set the refresh rates for the activity data of the different categories. In case the different queue categories have different refresh rates, the queue module 314 sets different counters for the different queue categories. Alternatively, if the queue categories are refreshed at the same rate, a single counter may be maintained for all the queue categories.

Figure 6:
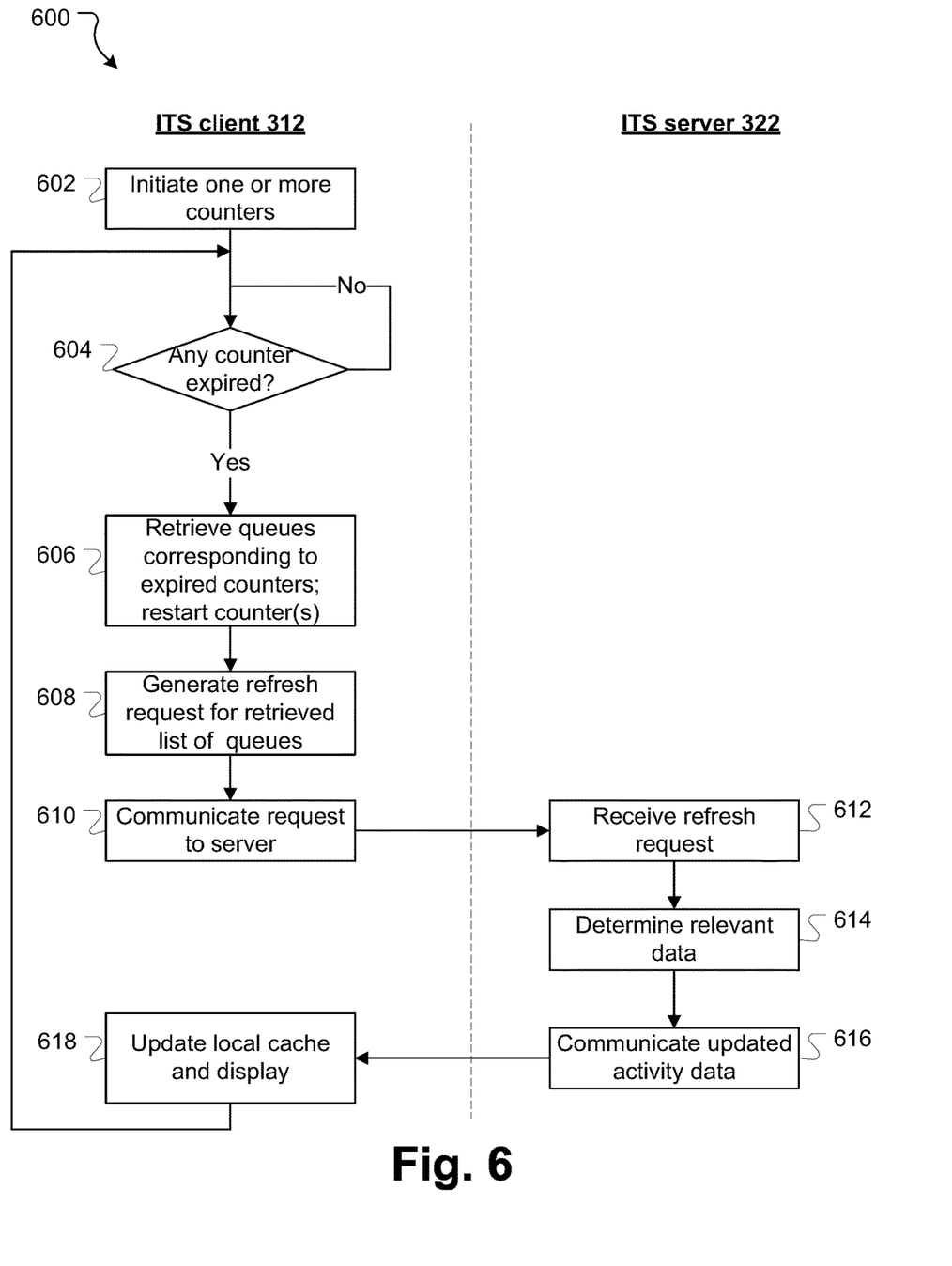
FIG. 6 is an example flowchart illustrating operations performed to refresh queues according to aspects of the present disclosure.

FIG. 6 illustrates an example method 600 for updating activity data with variable refresh rates according to aspects of the present disclosure.

The method 600 commences at step 602, where the queue module 314 initiates one or more counters corresponding to the one or more queue categories. As described previously, along with the queue data, the server 322 communicates refresh rates for the different categories to the queue module 314 when the queue panel is first generated and rendered. Depending on the received refresh rates, the queue module 314 initiates one or more counters upon receiving the refresh rate data.

For instance, if the queue panel is one such as the queue panel 200 shown in FIG. 2, where there are three categories (STARRED, TEAM and OTHER) each with a different refresh rate, the queue manager 314 may initiate three counters—one for each category. These counters may be called the starred counter, the team counter, and the other counter and they have different periodicities. For example, the starred counter may be set to time X, the team counter may be set to time Y, and the other counter may be set to time Z. In some examples, the times may be confined by the relation $X \leq Y \leq Z$. The counters commence at time zero and begin counting to the predetermined time (X, Y or Z). In some examples, if all the categories have the same refresh rates, the countdown times X, Y and Z may be equal.

Next, at step 604, the queue module 314 determines whether any of the one or more counters have expired.

If the queue manager 314 determines that none of the one or more counter have expired, the method returns to step 604.

Alternatively, if the queue module 314 determines that one or more of the counters have expired, the method proceeds to 606.

At step 606, the queue module 314 retrieves a list of queues corresponding to the expired counters. The queue manager 314 also restarts the one or more expired counters. For example, if the counter for the STARRED category 202 has expired, the queue module 314 retrieves a list of all the queues belonging to that category 202. Referring to queue panel 200, the queue module 314 retrieves the queue identifiers of the following queues: 'NY Prod' and 'NY New Hire' and 'NY Pending'.

At step 608, the queue module 314 generates a refresh request for the retrieved list of queues. The refresh request includes queue identifiers of the identified queues and the particular activity type that needs to be refreshed. Further, if the activity data that needs to be updated is a delta data (e.g., a data type that shows a difference in a previous state and the current state), the refresh request may also include the activity count currently saved in the local cache alongside the refresh request.

At step 610, the refresh request is communicated to the ITS server 322 and in particular the queue manager 327.

Next, at step 612, the queue manager 327 receives the refresh request, identifiers of the queues that need to be refreshed, and the activity type that needs to be updated.

At step 614, the ITS server 322 determines the activity data update for each of the queues in the received queue list. To this end, the queue manager 327 may query the data store and in particular, the issue data 325 in the data store 323 to retrieve the required activity data for each queue. If the activity data is issue count, the queue manager 327 requests an issue count for the list of queues. In one example, the issue count is retrieved using an issue-counts API for each queue the request includes a list of queue identifiers.

At step 616, the queue manager 327 communicates the activity data update back to the ITS client 312. In one example, the response includes the queue identifier and the corresponding activity data update.

At 618, once the ITS client 312 and in particular the queue module 314 receives the updated activity data from the ITS server 322 it updates the local cache and updates the activity data 208 displayed in the queue panel 200.

The method then returns to step 604.

In case the activity data is an issue count, the queue panel 200 may be configured to display a threshold count value. If the actual count is below this value, it is displayed in the activity data 208. Alternatively, if the count is higher than this threshold value, the threshold value is displayed. For example, if the threshold value is 999 and the actual count of the number of issues in a given queue is 1020, the queue panel displays a count of 999+ instead of 1020. In such cases, method 600 may include an additional decision step between steps 606 and 608. At that decision step, the queue module 314 may determine whether the issue count of any of the queues in the list exceeds the threshold value. If any such queues are identified, these are deleted from the list of queues in the refresh request. By avoiding requesting an issue count for queues with such high issue counts, embodiments of the present disclosure provide a number of technical benefits. For instance, removing such queues from the /issue-count API request, reduces database burden. Further, it improves response time for /issue-count API requests and improves user experience as the user see the updates faster.

Further, in method 600, once a counter expires the client generates and communicates a single activity data refresh request to update activity data for all queues in that category. If a category includes a large number of queues (e.g., 40-50 queues), the refresh request for such a category causes a spike in database load and takes more time to compute making the issue count API slow. To prevent this from happening, instead of refreshing the issue count of all the queues in a category in a single API call, the queues in a given category can be split into smaller groups and a refresh request may be generated and communicated for each group separately and sequentially. This would spread the database load avoiding overloading the database. Although this approach may increase the number of the calls to the /issue-count API, but each call would be lighter and faster. This will result in shorter API calls and faster response for issue counts.

Further still, although method 600 is described with reference to predetermined refresh rates—these refresh rates can be updated in real time. For example, in some cases, depending on server and database load, the server may update the refresh rates—make them less frequent at peak traffic times and return the refresh rates to preconfigured intervals at other times. In other examples, administrators may be able to configure the refresh rates for different categories. In both such cases, if the refresh rates change the server 322 communicates the updated refresh rates to the client 312. The client 312 updates its local cache and counter intervals accordingly.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer-implemented method, comprising:

displaying, on a display of a user device, a graphical user interface of an issue tracking system, the graphical user interface of the issue tracking system comprising:

a queue panel unique to a user, the queue panel displaying two or more user-defined queue categories, each user-defined queue category comprising a set of queues, wherein:

each queue of the set of queues is associated with a respective grouping of issue items from the issue tracking system having at least one parameter in common, the queue panel is further configured to display activity data corresponding to queues in at least one user-defined queue category of the two or more queue categories;

in accordance with a first refresh rate associated with a first queue category lapsing, initiating an update of first activity data associated with the first queue category, the first refresh rate based at least in part on a user-defined priority;

querying a server of an issue tracking system to obtain a first list of queues defined by the user under the first queue category;

generating a first refresh request for the identified first list of queues;

in response to submitting the first refresh request, receiving updated first activity data corresponding to each queue of the first list of queues, the updated first activity data comprising an aggregate of a parameter of the respective grouping of issue items associated with each queue; and in the queue panel of the graphical user interface, rendering the first activity data corresponding to each queue of the first list of queues;

in accordance with a second refresh rate associated with a second queue category lapsing, initiating an update of second activity data associated with the second queue category, the second refresh rate different from the first refresh rate;

querying the server of the issue tracking system to obtain a second list of queues defined by the user under the second queue category;

generating a second refresh request for the identified second list of queues;

in response to submitting the second refresh request, receiving updated second activity data corresponding to each queue of the second list of queues, the updated second activity data comprising the aggregate of the parameter of the respective grouping of issue items associated with each queue; and in the queue panel of the graphical user interface, rendering the second activity data corresponding to each queue of the second list of queues.

2. The computer-implemented method of claim 1, wherein the second refresh rate is predetermined.

3. The computer-implemented method of claim 1, wherein the second refresh rate is variable and varies based on server load.

4. The computer-implemented method of claim 1, wherein the first refresh rate of the first queue category is infinity.

5. The computer-implemented method of claim 1, further comprising:

initiating a first time counter for the first queue category, wherein the first time counter corresponds to the first refresh rate of the first queue category; and initiating a second time counter for the second queue category, wherein the second time counter corresponds to the second refresh rate of the second queue category.

6. The computer-implemented method of claim 1, wherein the activity data corresponding to queues within the first queue category is a count of a number of items present in the corresponding queue.

7. The computer-implemented method of claim 1, wherein the activity data corresponding to queues within the first queue category is a delta count indicating a number of new items in the queue since the activity data was last refreshed.

8. The computer-implemented method of claim 7, wherein the first refresh request includes a count of a number of items present in a corresponding queue.

9. A non-transitory computer readable medium comprising instructions, which when executed by a processor of a computer device cause a computing device to perform steps comprising:

displaying, on a display of the computer device, a graphical user interface of an issue tracking system, the graphical user interface of the issue tracking system comprising:

a queue panel unique to the user, the queue panel displaying two or more user-defined queue categories, each user category comprising a set of queues wherein:

each queue of the set of queues is associated with a respective grouping of issue items from the issue tracking system having at least one parameter in common, the queue panel is further configured to display activity data corresponding to queues in at least one user-defined queue category of the two or more queue categories;

in accordance with a first refresh rate associated with a first queue category lapsing, initiating an update of first activity data associated with the first queue category, the first refresh rate based at least in part on a user-defined priority;

querying a server of an issue tracking system to obtain a first list of queues defined by the user under the first queue category;

generating a first refresh request for the identified first list of queues;

in response to submitting the first refresh request, receiving updated first activity data corresponding to each queue of the first list of queues, the updated first activity data comprising an aggregate of a parameter of the respective grouping of issue items associated with each queue;

in the queue panel of the graphical user interface, rendering the first activity data corresponding to each queue of the first list of queues;

in accordance with a second refresh rate associated with a second queue category lapsing, initiating an update of second activity data associated with the second queue category, the second refresh rate different from the first refresh rate;

querying the server of the issue tracking system to obtain a second list of queues defined by the user under the second queue category;

generating a second refresh request for the identified second list of queues;

in response to submitting the second refresh request, receiving updated second activity data corresponding to each queue of the second list of queues, the updated second activity data comprising the aggregate of the parameter of the respective grouping of issue items associated with each queue; and in the queue panel of the graphical user interface, rendering the second activity data corresponding to each queue of the second list of queues.

10. The non-transitory computer readable medium of claim 9, wherein the second refresh rate is variable and varies based on server load.

11. The non-transitory computer readable medium of claim 9, wherein the first refresh rate of the other of the at least two queue categories is infinity.

12. The non-transitory computer readable medium of claim 9, further comprising instructions which cause the processor to perform steps comprising:

initiating a first time counter for the first queue category, wherein the first time counter corresponds to the first refresh rate of the first queue category; and initiating a second time counter for the second queue category, wherein the second time counter corresponds to the second refresh rate of the second queue category.

\* \* \* \* \*